(12) United States Patent
Atkins et al.

(10) Patent No.: US 8,347,143 B2
(45) Date of Patent: Jan. 1, 2013

(54) FACILITATING EVENT MANAGEMENT AND ANALYSIS WITHIN A COMMUNICATIONS ENVIRONMENT

(75) Inventors: Mark G. Atkins, Arvada, CO (US); Dawn S. Moyer, Catskill, NY (US)

(73) Assignee: International Business Machines Corporation, Armonk, NY (US)

( * ) Notice: Subject to any disclaimer, the term of this patent is extended or adjusted under 35 U.S.C. 154(b) by 1355 days.

(21) Appl. No.: 11/342,426

(22) Filed: Jan. 30, 2006

(65) Prior Publication Data

US 2007/0180103 A1 Aug. 2, 2007

(51) Int. Cl.
*G06F 11/00* (2006.01)
*G06F 15/18* (2006.01)
*G06F 9/00* (2006.01)

(52) U.S. Cl. ............... 714/26; 714/46; 714/39; 719/318; 719/310

(58) Field of Classification Search .................... 709/224
See application file for complete search history.

(56) References Cited

U.S. PATENT DOCUMENTS

| | | | | |
|---|---|---|---|---|
| 4,393,490 | A | 7/1983 | Culley | 370/13 |
| 5,355,364 | A | 10/1994 | Abali | |
| 5,453,978 | A | 9/1995 | Sethu | |
| 5,463,768 | A | 10/1995 | Cuddihy et al. | 395/183.13 |
| 5,483,637 | A * | 1/1996 | Winokur et al. | 714/26 |
| 5,495,470 | A | 2/1996 | Tyburski et al. | 370/14 |
| 5,687,223 | A | 11/1997 | Elliott et al. | 379/113 |
| 5,812,549 | A | 9/1998 | Sethu | |
| 5,884,090 | A | 3/1999 | Ramanan et al. | |
| 5,892,898 | A | 4/1999 | Fujii et al. | 395/185.1 |
| 6,021,442 | A | 2/2000 | Ramanan et al. | |
| 6,081,518 | A * | 6/2000 | Bowman-Amuah | 370/352 |
| 6,484,203 | B1 | 11/2002 | Porras et al. | 709/224 |
| 6,487,208 | B1 | 11/2002 | Chirashnya et al. | 370/400 |
| 6,502,133 | B1 * | 12/2002 | Baulier et al. | 709/224 |
| 6,598,179 | B1 * | 7/2003 | Chirashnya et al. | 714/37 |
| 6,701,464 | B2 | 3/2004 | Austen et al. | 714/48 |
| 6,708,291 | B1 | 3/2004 | Kidder | 714/39 |
| 6,708,297 | B1 | 3/2004 | Bassel | 714/47 |
| 6,715,097 | B1 | 3/2004 | Kidder et al. | 714/2 |
| 6,718,403 | B2 | 4/2004 | Davidson et al. | 710/19 |
| 7,162,509 | B2 * | 1/2007 | Brown et al. | 709/201 |
| 7,389,510 | B2 * | 6/2008 | Forrester | 718/105 |
| 7,730,494 | B1 * | 6/2010 | Rosenbluth et al. | 719/318 |
| 2006/0294214 | A1 * | 12/2006 | Chou | 709/223 |

OTHER PUBLICATIONS

"Automatic Analysis of Error Records in a Communication Controller for Optimum Maintenance," J. Combes, J.L. Cottenet, I. Flockhart and C. Huber; IBM Technical Disclosure Bulletin, vol. 31, No. 6, Nov. 1988, pp. 138-141.

Lascu et al., "An Introduction to the New IBM e-server pSeries high Performance Switch". International Techinical Support Organization. ibm.com/redbooks. Dec. 2003.

* cited by examiner

*Primary Examiner* — Asad Nawaz
*Assistant Examiner* — Jason Harley
(74) *Attorney, Agent, or Firm* — Steven Chiu, Esq.; Kevin P. Radigan, Esq.; Heslin Rothenberg Farley & Mesiti P.C.

(57) ABSTRACT

The management and analysis of events of communications environments are facilitated. Events, such as alert and network events, are separated into a plurality of pools, depending on the classification of event. Each pool has events exclusive of one type of event. The events are placed in the appropriate pools via one or more analysis routines. Additionally, events of at least one type of pool are further analyzed using one or more analysis routines to determine which events, if any, are to be reported.

19 Claims, 10 Drawing Sheets

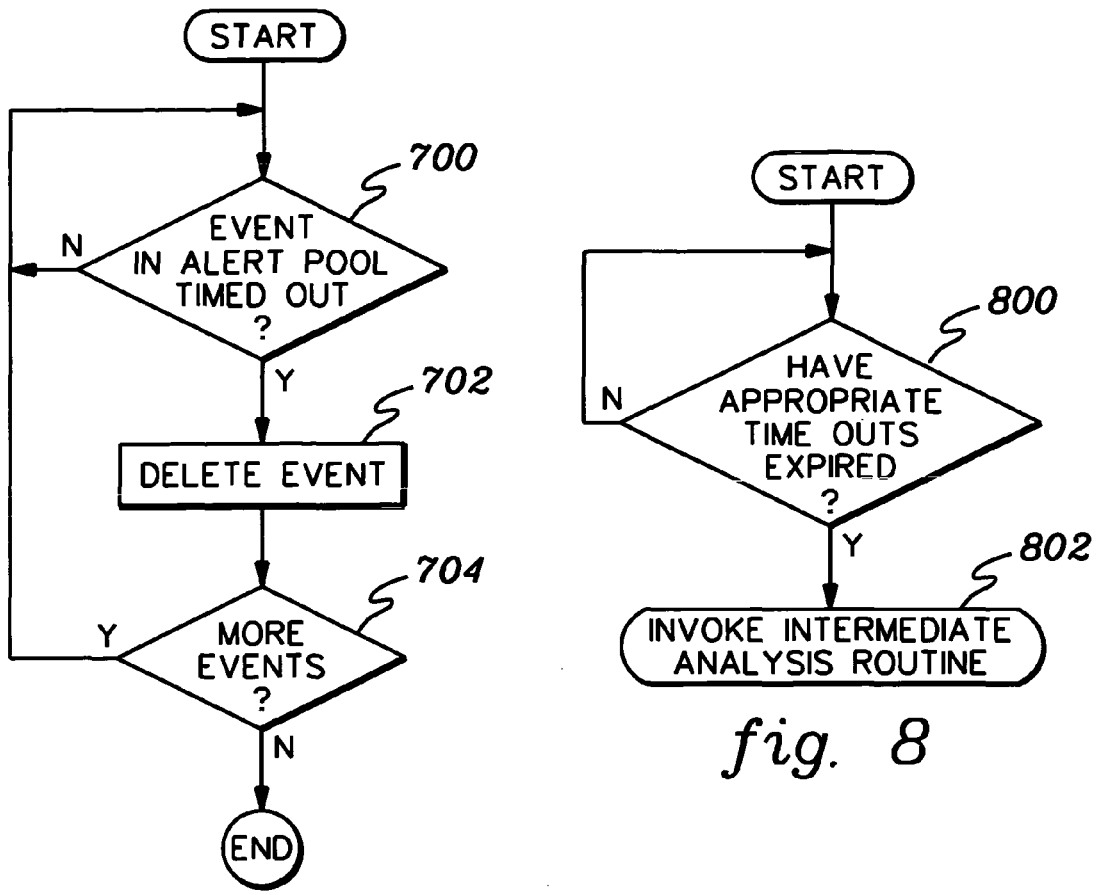
fig. 7
fig. 8
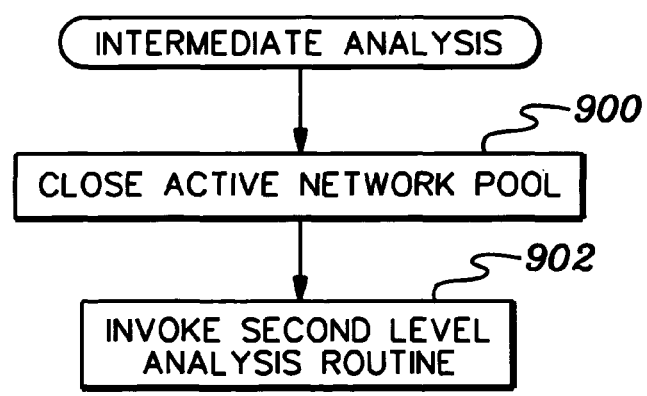
fig. 9

FACILITATING EVENT MANAGEMENT AND ANALYSIS WITHIN A COMMUNICATIONS ENVIRONMENT

TECHNICAL FIELD

This invention relates, in general, to processing within communications environments, and more particularly, to facilitating the management and analysis of events of the communications environments.

BACKGROUND OF THE INVENTION

In communications environments, as well as other environments, it is important to quickly and accurately determine faulty components of the environments, in order to effect corrective action by repairing and/or replacing the faulty components.

Previously, in order to determine the faulty components of a communications environment, such as a switched network environment, errors were logged, events were generated from the logged errors and the events were reported. Previous techniques of reporting errors often failed to recognize cause and effect relationships between events across a network, and thus, failed to isolate to a theoretical minimal field replaceable unit (FRU) list. This, in turn, forced service personnel to determine the correct course of action using probabilities and other diagnostic techniques, thus extending system and/or resource outage.

SUMMARY OF THE INVENTION

Based on the foregoing, a need exists for an enhanced capability to manage and analyze events within a communications environment, which takes into account the cause and effect relationships of events within the communications environment, as well as an ability to infer a single root cause failing component based on a group of events that taken individually would otherwise indicate several possible failing components. As one example, a need exists for an enhanced capability to determine and report faulty components of a communications network using cause and effect relationships of events within the communications network.

The shortcomings of the prior art are overcome and additional advantages are provided through the provision of a method of facilitating, in a communications environment in which at least one of individual serviceable and causal real-time events are determined and reported, selection of time-related serviceable events to be reported. The method includes, for instance, having a first event pool including one or more first events exclusively of a first classification, each first event of the one or more first events having an individual time-out attribute associated therewith, the individual time-out attribute of a first event being tunable to control a closing of the first event pool; having a second event pool including one or more second events exclusively of a second classification, each second event of the one or more second events having an individual time-out attribute associated therewith, the individual time-out attribute of a second event being tunable to control an amount of time the second event corresponding to the individual time-out attribute is usable in applying causal elimination against one or more first events of the first event pool, wherein events of the first event pool and the second event pool are related in time as defined by the individual time-outs of the events and wherein the tuning of the time-outs controls which events are related to one another in time; and performing causal elimination on one or more first events of the first event pool using one or more second events of the second event pool, wherein closing of the first event pool is independent of time-outs of the one or more second events of the second event pool, thus facilitating timely reporting of one or more first events that are to be serviced.

System and computer program products corresponding to the above-summarized method are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 7 depicts one embodiment of the logic associated with processing an event in an alert pool when that event has timed out, in accordance with an aspect of the present invention;

FIG. 8 depicts one embodiment of the logic associated with handling time outs associated with a network pool, in accordance with an aspect of the present invention;

FIG. 9 depicts one embodiment of the logic associated with an intermediate analysis routine used in the process flow of FIG. 5, in accordance with an aspect of the present invention.

BEST MODE FOR CARRYING OUT THE INVENTION

In accordance with one or more aspects of the present invention, the management and analysis of events of communications environments are facilitated. For instance, events, such as alert and network events, are separated into a plurality of pools depending on the classification of event, and the pools are used to facilitate analysis of the events. Further, one or more of the pools are partitioned into subpools to further facilitate analysis.

One or more aspects of the present invention are incorporated and used in, for instance, a communications environment, such as a communications environment that includes a communications network. One type of a communications network is a switch network, and examples of switch networks are described in U.S. Pat. No. 6,021,442, entitled "Method And Apparatus For Partitioning An Interconnection Medium In A Partitioned Multiprocessor Computer System," Ramanan et al., issued Feb. 1, 2000; U.S. Pat. No. 5,884,090, entitled "Method And Apparatus For Partitioning An Interconnection Medium In A Partitioned Multiprocessor Computer System," Ramanan et al., issued Mar. 16, 1999; U.S. Pat. No. 5,812,549, entitled "Route Restrictions For Deadlock Free Routing With Increased Bandwidth In A Multi-Stage Cross Point Packet Switch," Sethu, issued Sep. 22, 1998; U.S. Pat. No. 5,453,978, entitled "Technique For Accomplishing Deadlock Free Routing Through A Multi-Stage Cross-Point Packet Switch," Sethu et al., issued Sep. 26, 1995; and U.S. Pat. No. 5,355,364, entitled "Method Of Routing Electronic Messages," Abali, issued Oct. 11, 1994, each of which is hereby incorporated herein by reference in its entirety.

Figure 1:
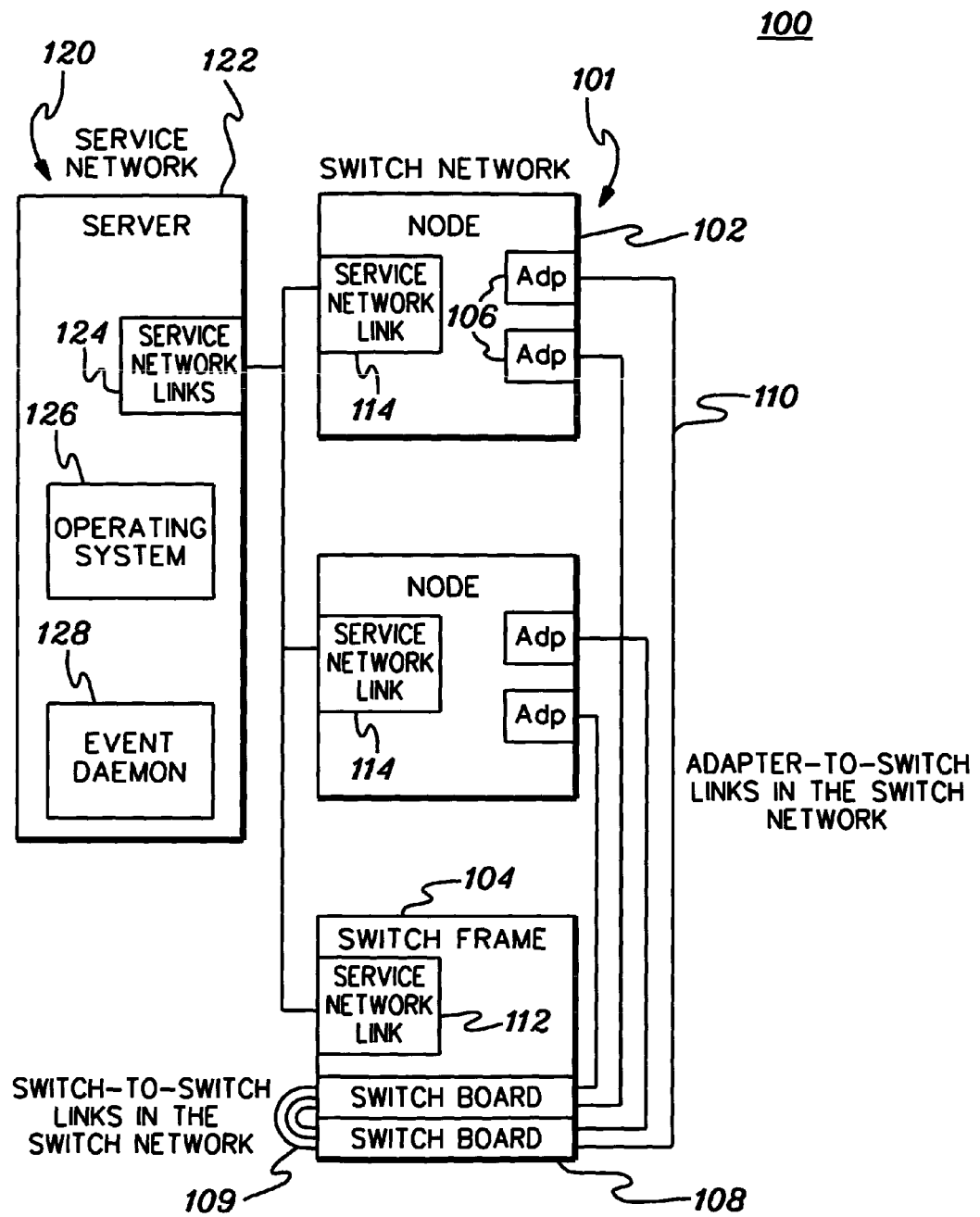
FIG. 1 depicts one embodiment of a communications environment incorporating and using one or more aspects of the present invention.

One embodiment of a communications environment incorporating and using one or more aspects of the present invention is described with reference to FIG. 1. A communications environment 100 includes, for instance, a switch network 101, which may be optical, copper, phototonic, etc., or any combination thereof. As is known, a switch network is used in communicating between computing units (e.g., processors) of a system, such as a central processing complex. The processors may be, for instance, pSeries® processors or other processors, offered by International Business Machines Corporation, Armonk, N.Y. One switch network offered by International Business Machines Corporation is the High Performance Switch (HPS) network, an embodiment of which is described in "An Introduction to the New IBM eServer pSeries High Performance Switch," SG24-6978-00, December 2003, which is hereby incorporated herein by reference in its entirety. (IBM and pSeries are registered trademarks of International Business Machines Corporation, Armonk, N.Y., U.S.A. Other names used herein may be registered trademarks, trademarks or product names of International Business Machines Corporation or other companies.)

Switch network 101 includes, for example, a plurality of nodes 102, such as Power 4 nodes offered by International Business Machines Corporation, Armonk, N.Y., coupled to one or more switch frames 104. A node 102 includes, as an example, one or more adapters 106 (or other network interfaces) coupling nodes 102 to switch frame 104. Switch frame 104 includes, for instance, a plurality of switch boards 108, each of which is comprised of one or more switch chips. Each switch chip includes one or more external switch ports, and optionally, one or more internal switch ports. A switch board 108 is coupled to one or more other switch boards via one or more switch-to-switch links 109 in the switch network. Further, one or more switch boards are coupled to one or more adapters of one or more nodes of the switch network via one or more adapter-to-switch links 110 of the switch network.

Switch frame 104 also includes at least one service network link 112 (e.g., Ethernet adapter) coupling the switch frame to a service network 120 of communications environment 100. Similarly, a node 102 includes, for instance, one or more service network links 114 (e.g., Ethernet adapters) coupling the node to service network 120.

Service network 120 is an out-of-band network that provides various services to the switch network. In this embodiment, the service network is responsible for managing and facilitating analysis of events of the communications environment. As one example, service network 120 includes a server 122 having, for instance, one or more service network links 124 (e.g., Ethernet adapters), which are coupled to one or more links 114 of nodes 102 and/or one or more links 112 of switch frame 104. Server 122 further includes an operating system 126, such as a LINUX operating system, and an event daemon 128, which is described in further detail with reference to FIG. 2.

In one embodiment, event daemon 128 receives error events and data associated therewith from one or more event reporting clients 206. An event reporting client is, for instance, an adapter or switch of switch network 101, or any other component coupled to the event daemon. The associated event data includes the specific error event id and the logical location structures pertaining to the device in error and it's associated endpoints for link events. The event daemon includes an event configuration data structure 200 used to map specific event ids with their associated analysis attributes; one or more analysis pools 202 used to separate different event classifications to facilitate analysis; and one or more analysis routines 204 used to analyze the events, each of which is described in further detail below.

Figure 3:
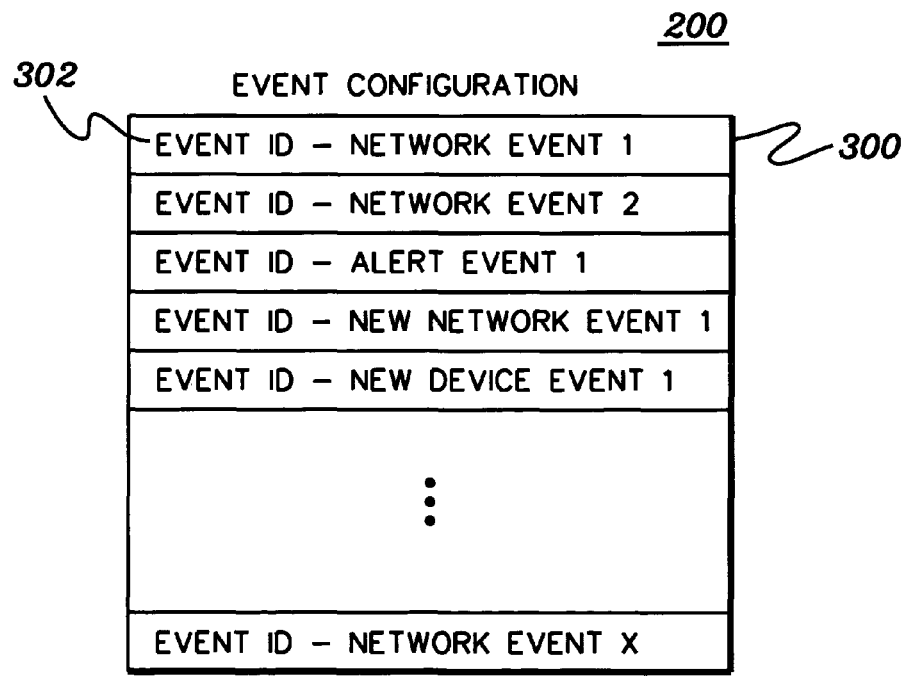
FIG. 3 depicts one embodiment of an event configuration data structure of FIG. 2, in accordance with an aspect of the present invention.

Event configuration data structure 200 is, for instance, a table or other structure that includes one or more event id stanzas 300 (FIG. 3). The event ids are events received from event reporting clients 206 and/or new events formed by one or more events received from the reporting clients. The configuration file is setup ahead of time with a set of rules about how to analyze an event. In the examples described herein, there are two classifications of events: alert events and network events, including new events. However, in other embodiments, there may be other classifications of events. Each event has an event identifier (EventId) 302 associated therewith, and each event id has one or more corresponding attributes. The attributes of one event can be the same or different from another event. Possible attributes associated with an EventId include the following:

EventId—comprised of:
  Pool Classification—character string representing the pool in which to add the event (e.g., AT=alert event, NT=network event, ND=new network device event, NN=new network event);
  Devicetype—hex number representing the device type in error (e.g., 10=switch, 20=switch link, 30=adapter, 40=adapter link); and
  Description—hex error message number describing the error (e.g., D007 for data parity error).
priority—the priority used for elimination of events and the forming of new events. The priority is used during network analysis. The event with the highest priority prevails. It is used to determine which new device and new network event should be formed first. An event can only be used as a member of a new event once. The priority is also used when two events can perform causal analysis and eliminate each other. The event with the highest priority prevails.
timeout—timeout used to determine network pool or alert event time out.
report—used to determine if an alert event should be reported.
FRU_list—list of devices and actions to take when a device is selected to be reported.
elimination_level—location level to eliminate other events. Corresponds to logical location fields (EventId_location and EventId_endpoint_locations) received from the reporting clients. For instance, cage is a location level.

EP_elim_EventIds—list of non-alert link device events (e.g., EventIds device types of 02 and 04) to eliminate when their EventId-endpoint_location matches this EventId's EventId_location at its elimination_level. This type of elimination is called endpoint (EP) causal elimination.

LD_elim_EventIds—list of non-alert device events (e.g., EventIds all device types) to eliminate when their Event Id_location matches this EventId's EventId_location at its elimination_level. This type of elimination is called local device (LD) causal elimination.

ND_Expr—New device EventId expression. The ND-Expr is a Boolean expression that defines a list of non-alert candidate events at a specific logical location level or number of unique logical location levels that form the new event condition. For instance, a list of events that occur on the three specific ports, 1, 2 and 3 or on any three unique ports. It pertains to a single device location defined down to, for instance, its Card# level. The new device EventId expression is evaluated after the network pool has closed and is created when two or more logged events that share a specific device location meet this criteria. The ability to create an expression that defines a specific device technique allows for the addition of new device EventIds by simply adding the new EventId and it's associated expression versus coding a new analysis routine. This expression is made up of device level location operands, as well as Boolean operations. Since a specific device location is defined down to the Card# level (e.g., adapter/switch), in this example, only chip and port level operators are valid. Examples of language definitions and rules follow:

the EventId Devicetype defines the specific device type the new EventId represents (e.g., switch or adapter). Any valid EventId Devicetype may be a member of the expression. However, only EventIds that either share or are endpoints of the Devicetype specified on the new EventId may be used within the same expression. For instance, a new device EventId for a switch may contain both switch link and adapter link EventIds. This is due to the fact that an adapter link's endpoint location may also share the same switch device location and is therefore valid.

a number followed by a specific device level location (e.g., 2P and 2C). 2P defines 2 unique ports on the same card and chip, and 2C defines 2 unique chips on the same card.

a number preceded by a specific device level location (e.g., P2 and C2). P2 defines port number 2 on the same card and chip, and C2 defines chip number 2 on the same card.

Boolean AND and OR operators are defined by #OR# and #AND#.

groups of EventIds are defined by the set notation brackets "{ }" and are separated by commas as are brackets within brackets. Location level and Boolean operators precede brackets, and location level operators precede Boolean operators. These rules are for ease of parsing.

Examples:
EventId-NT10F040:
ND_Expr=2C#AND#{NT10F0F7}—defines that a specific switch has reported 2 or more Events associated with this new eventId where each occurred on a unique chip.
EventId-NT30F000: ND-Expr=#OR#{#AND# {C0#OR#{NT40D007, NT40D000, NT40D001}, C1#OR#{NT40D007, NT40D000, NT200510}}, #AND#{C2#OR#{NT40D007, NT40D000, NTBB40D001}, C5#OR#{NT40D007, NT40D000, NT20510}}, #AND#{C6#OR# {NT40D007, NT40D000, NT40D001}, C7#OR #{NT40D007, NT40D000, NT200510}}, Defines that 2 unique adapters chips on the same card or switches that are endpoints of these adapters chips have reported 2 or more events associated with this new EventId occurring on Adapters 0&1 or 2&3 or 4&5 or 6&7.

NN_Expr—New network Event Id expression. The NN_Expr is a list of two or more non-alert events occurring on unique device logical locations. The ability to create an expression that defines a specific network technique allows for the addition of new network EventIds by simply adding the new EventId and it's associated expression versus coding a new analysis routine. Endpoint connected EventIds are not considered unique. Examples of language definitions and rules follow:

is not device location level specific. All EventIds Devicetypes may be combined within the same expression.

groups of EventIds are defined by the set notation brackets "{ }" and are separated by commas.

Examples:
EventId-NT20F01E: NN_Expr={NT40D01A, NT40D03A, NT200800, NT200801, NT200802, NT200803, NT200807, NT30400E}
Defines an Adapter or Switch has reported 2 or more events associated with this New EventId on unique Locations.

associated_new_EventIds—list of new EventIds (Device or Network) of which this EventId can be a member.

The information included in the event configuration data structure is used to relate events to one another and to facilitate handling and/or analysis of those events. One goal is to be able to analyze events in an environment to properly determine failing components based on the hierarchical logical location structures of the components within the environment. Further, the reporting to service personnel of those events which should not lead to the replacement of resources is suppressed.

Figure 4A:
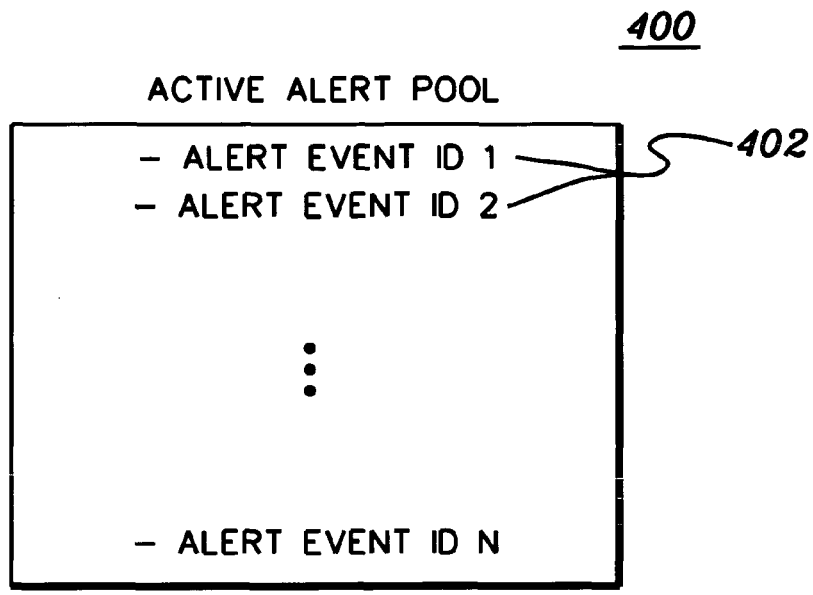
FIG. 4a depicts one example of an active alert pool used in accordance with an aspect of the present invention.

Returning to FIG. 2, in addition to event configuration data structure 200, event daemon 128 includes analysis pools 202. In accordance with an aspect of the present invention, analysis pools 202 include a plurality of pools, each having events of a particular classification. This multi-pool design separates different classifications of events into different pools. Each event in a pool is associated with its own individual time out that is involved with controlling each pool's analysis window. The analysis window is an adjustable or tunable window, so that events may be related during an analysis phase. Pool membership is defined by the event id's pool classification, and time out attributes are defined for each event id via the configuration file. Examples of analysis pools include an active alert pool 400 (FIG. 4a) and an active network pool 450 (FIG. 4b), each of which is described below.

Active alert pool 400 (FIG. 4a) includes events having event ids with a pool classification of alert. Each alert in the active alert pool has an individual time out value associated therewith. The alert pool does not time out nor close. Event ids are simply deleted from the pool when their individual time out expires. Events in the alert pool may be configured to eliminate network events occurring within their time out window via the configuration file. Thus, alert event causal elimination can span multiple network pools. For instance, two sequential network pools may both close within a 15 minute time period, whereas an alert event may be defined to time out in 20 minutes.

In one example, active alert pool 400 includes one or more alert events 402, such as intentional administrative actions, like power downs; status events indicating the status of a component (e.g., a link); check-stops; power failures; switch-reset events, etc. Each alert in the alert pool is compared to each incoming and existing event and is used to mark events in subpools within an active network pool effected by causal elimination. An alert event is configured to eliminate network events occurring within its time out window. This elimination is performed using, for instance, the elimination level, EP_elim_EventIds and/or LD_elim_EventIds, as described herein. However, the alert events do not become part of the active network pool.

An alert event is analysis independent and requires no analysis to determine if it should or should not be reported. It is configured to report unconditionally or not to report at all.

Figure 2:
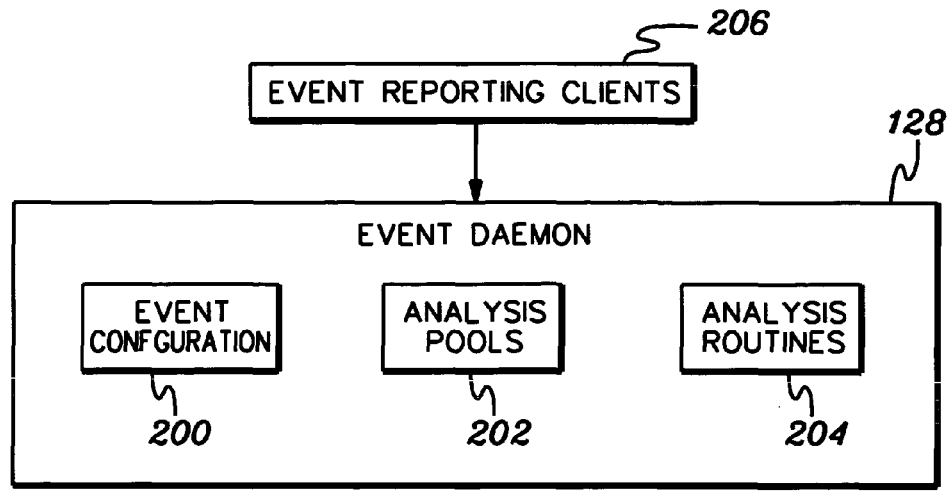
FIG. 2 depicts further details regarding an event daemon of FIG. 1, in accordance with an aspect of the present invention.

As an example, if an alert event is configured to be reported, it is reported immediately and does not wait for its time out to expire. The configuration of an alert is specified in configuration data structure 200 (FIG. 2).

Active network pool 450 (FIG. 4b) includes, for instance, events with a non-alert pool classification. This type of pool is closed for analysis (no more event ids accepted) when all individual network events in the pool have timed out (referred to herein as a slow pool time out). In this manner, the pool remains open and continues to include new real-time events (e.g., events received from reporting clients) while activity is steady. While the pool is open, alert and network causal elimination is applied, as described herein. However, events effected by causal elimination are merely marked for elimination and are eliminated from the network pool after the pool closes. These effected events are still added to the network pool, apply network analysis to other events in the network pool and effect the timeout of the network pool. Duplicate incoming events (e.g., same event at the same location) are deleted as they are encountered, and thus, do not affect the time out of the entire pool. This avoids an infinite pool time out condition on hot errors (events that cannot be suppressed). The slow pool time out is set to the event id's actual time out that expires at the latest time. For each new event id that arrives in the pool, its actual time out is calculated and tested against the existing slow pool time out. If it is greater, it becomes the new slow pool time out. Since various causal elimination actions are applied to each incoming event, a small period of time is elimination is being applied. Once elimination actions are complete, the original slow pool time out is restored if it has yet to expire; otherwise, the pool is closed immediately. When the pool closes, the remaining events undergo further analysis (e.g., to form new events, etc.). In particular, the events remaining in the pool are analyzed in relationship to one another. For instance, network events may be configured to be a member of a new network event, eliminate another event, or be eliminated by another event, as indicated in the configuration file. The closed network pool removes the events effected by causal elimination and then forms new device and network events with the remaining events. If a network event is not combined with another event or eliminated by another event, it is reported, as defined by the rules.

One example of pseudo-code used for the slow pool time out is as follows:

```
/* Don't set any incoming Event pool time out. Use Dummy Event to control
    Network Pool time out instead */
/* Dummy_event_tmeout controls when Network pool times out. */
- Time_needed_4elimination = 10 secs; /* or whatever makes sense
- If (1st Event in Pool) or (!(1st Event in Pool) and
        (Incoming_event_config_table_timeout + Currentime >
        Orig_Dummy_evt_poptime) ) {
    Dummy_event_timeout = Incoming_event_config_table_timeout +
        Time-needed_4elimination;
    Orig_Dummy_event_poptime = Incoming_event_config_table_timeout +
        Currentime; /* Saved to resore original timeout
}
- Do Alert and Dup Elimination;
- If   !(Duplicate Event)  and   (Orig_Dummy-evt-poptime > Currentime) {
    Dummy_event_timeout = 0;      /* Immediate timeout
} else {
    Dummy_event_timeout + Currentime – Orig_Dummy_event_poptime; /*
        Restore original timeout w/o elimination time
}
In the above psuedo-code, "!" represents "not."
```

In one embodiment, in the active network pool, event members are subpooled into specific device level locations for ease of forming new device events. In one example, the device locations (e.g., switch, adapter) are defined down to the card number level (e.g., Frame#Cage#CagetypeDevicetypeCard#).

Figure 4B:
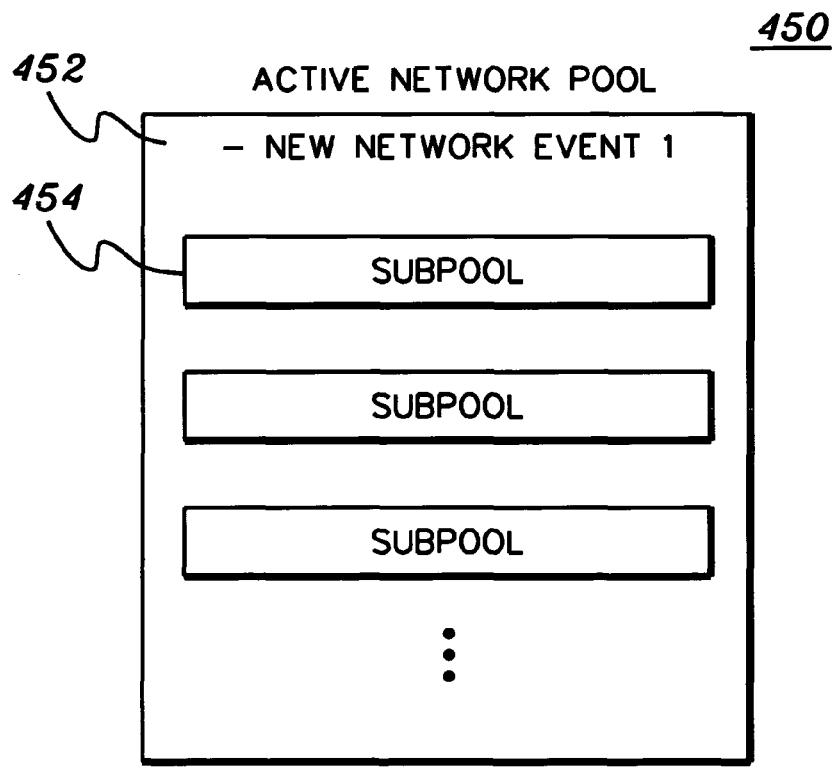
FIG. 4b depicts one embodiment of an active network pool used in accordance with an aspect of the present invention.

As depicted in FIG. 4b, active network pool 450 includes, for instance, a new network event 452 that may be created during analysis by combining one or more other events, and a plurality of device subpools 454, which are described in further detail below. Although in this example, one network event and three subpools are shown, in other examples, there may be zero or more new network events, zero or more new device events, and/or zero or more subpools in any given active network pool.

Figure 4C:
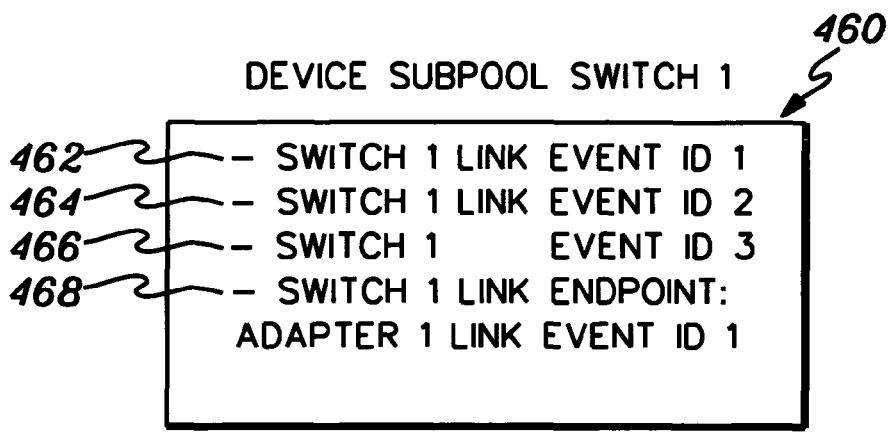
FIGS. 4c-4e depict examples of device subpools of the active network pool of FIG. 4b, in accordance with an aspect of the present invention.
Figure 4D:
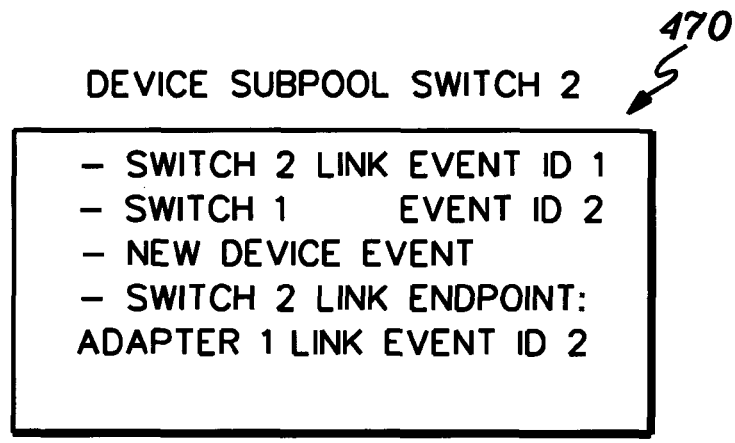
Figure 4E:
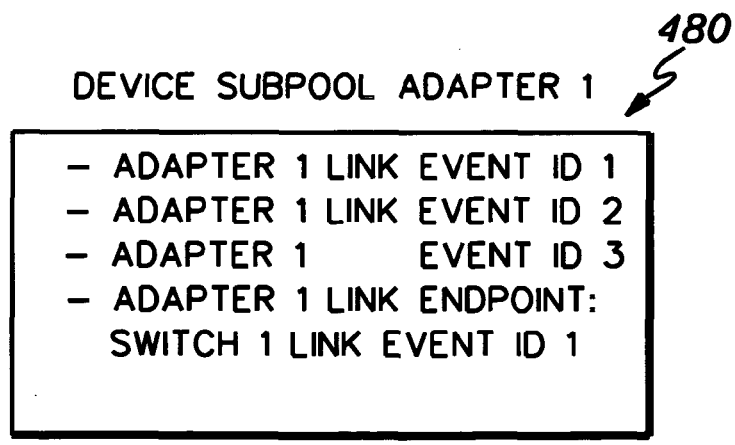

Subpools 454 further facilitate the defining of interrelationships between events. An event pool and related subpools have unique names. As one example, the subpool is a device subpool in which there is one device subpool for each hardware device having an event to be reported, and a subpool is created based upon, for instance, device location. For instance, as shown in FIGS. 4c & 4d, a device subpool may be created for a specific switch or adapter event. As shown in FIG. 4c, a subpool 460 is created for Switch 1, in which it indicates there is a Switch-1 Link EventId 1 (462), a Switch-1 Link EventId 2 (464), a Switch-1 EventId 3 (466), and an adapter associated with the Switch-Link by Switch-1 Link endpoint: Adapter-1, Link EventId-1 (468). Similarly, there is a device subpool 470 for Switch 2 (see, e.g., FIG. 4d) and a device subpool 480 for Adapter 1 (see, e.g., FIG. 4e). As described, a subpool includes a device for which events are being reported, as well as an endpoint of that device, such as an adapter in the switch example.

Figure 5:
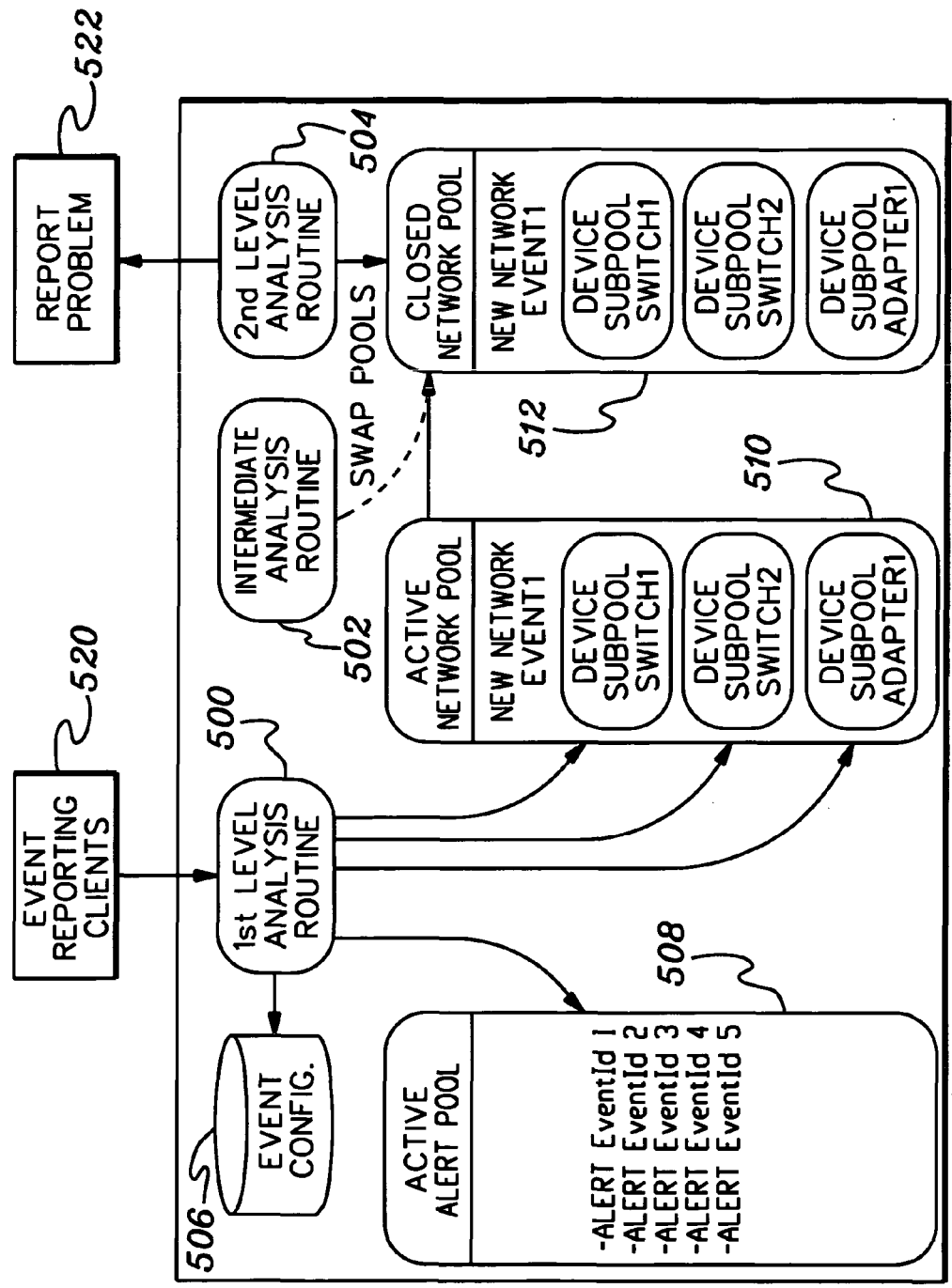
FIG. 5 depicts one embodiment of a process flow of an event, in accordance with an aspect of the present invention.

Returning to FIG. 2, event daemon 128 further includes one or more analysis routines 204. These routines are used in analyzing the reported events. As examples, analysis routines used in accordance with an aspect of the present invention include a first level analysis routine 500 (FIG. 5), an intermediate analysis routine 502 and a second level analysis routine 504, each of which is described in further detail below. Collectively, these routines use data in an event configuration data structure 506 to manage events in one or more analysis pools, such as an active alert pool 508, an active network pool 510 and a closed network pool 512.

First level analysis routine 500 is invoked, in response to receiving an event from, for instance, an event reporting client 520. The first level analysis routine is responsible for determining the classification of event and placing the event in one of the plurality of active multiple pools, such as active alert pool 508 and/or active network pool 510, as described with reference to FIGS. 6a-6b.

When the active network pool times out via, for instance, the slow pool time out, intermediate analysis routine 502 is invoked. The intermediate analysis routine closes the pool and invokes second level analysis routine 504. The second level analysis routine evaluates new events in the closed pool, as described below. When the second level analysis routine completes its analysis, it reports any remaining events (522). Further details regarding the analysis routines are described below.

Figure 6A:
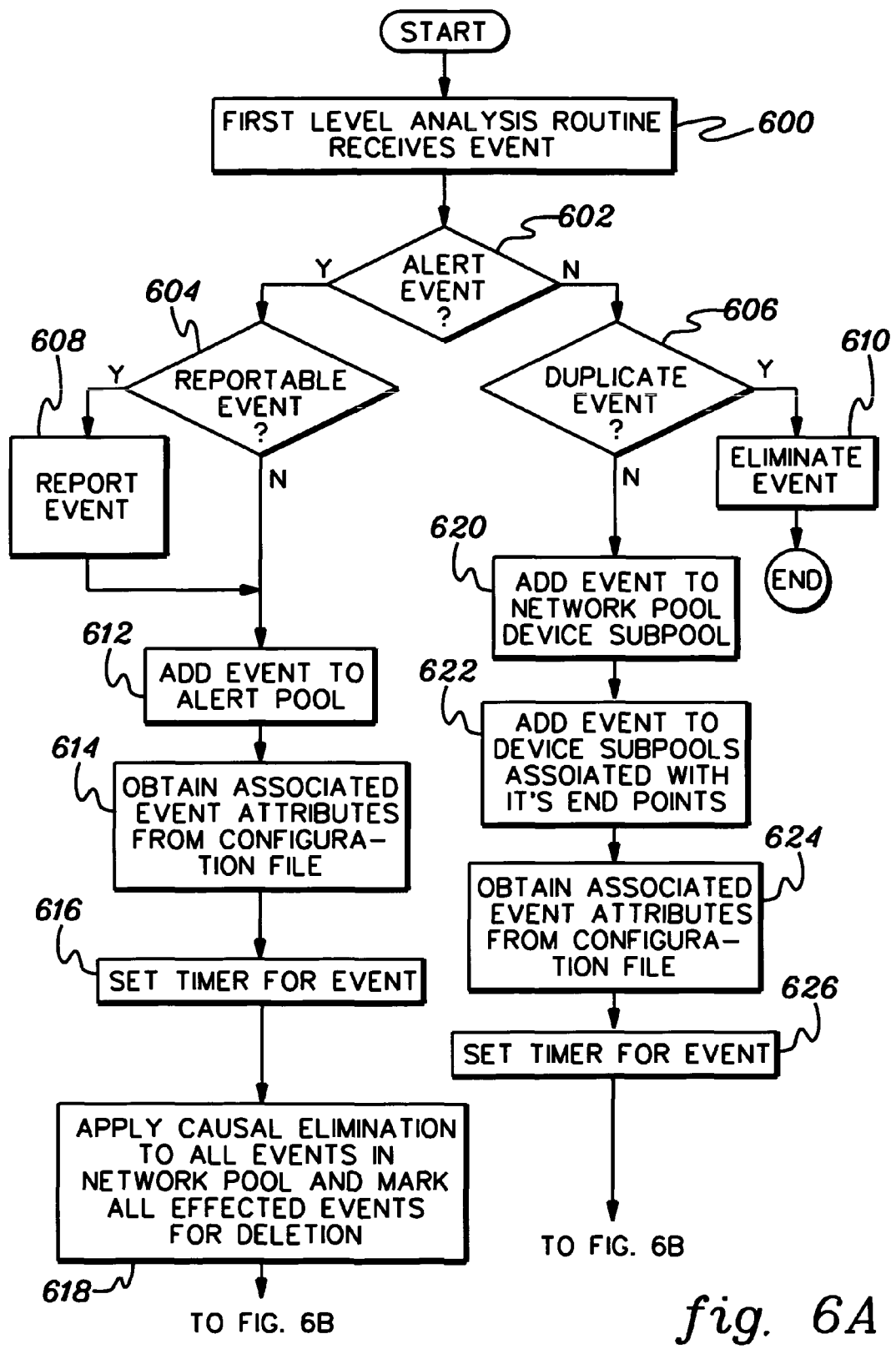
FIGS. 6a-6b depict one embodiment of the logic associated with a first level analysis routine used in the process flow of FIG. 5, in accordance with an aspect of the present invention.
Figure 6B:
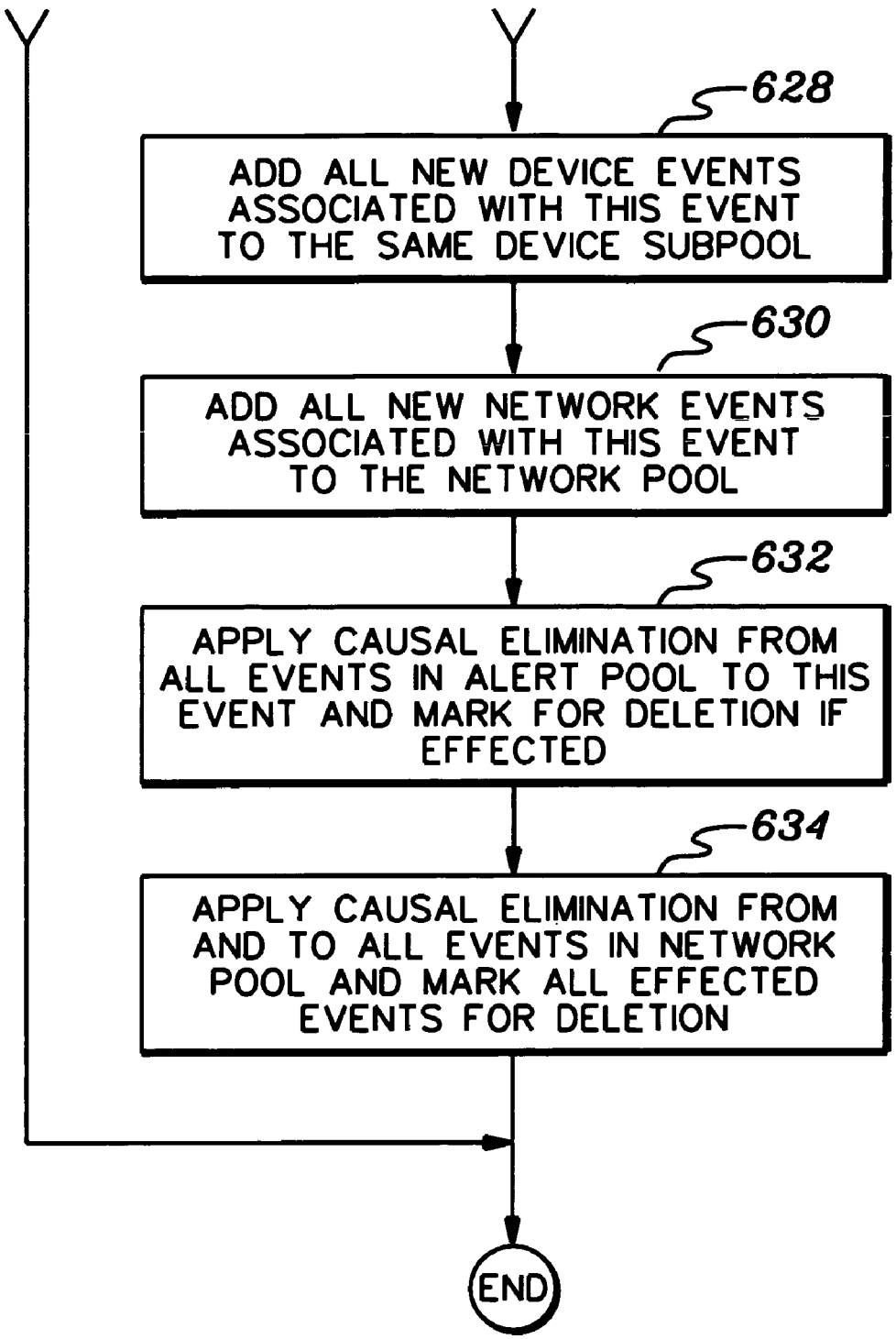

Referring to FIGS. 6a-6b, one embodiment of the logic associated with a first level analysis routine is described. Within this description, reference is also made to FIG. 5. Thus, reference numbers beginning with "5" refer to components in FIG. 5, and similarly, reference numbers beginning with "6" refer to steps in FIGS. 6a-6b.

Initially, the first level analysis routine receives an event, STEP 600 (FIG. 6a). As one example, event reporting clients 520 pass to the first level analysis routine an identifier of the event (EventId), a location of the device in error (EventId_location), and the device's endpoint location (EventId_endpoint_locations), each of which is described below.

It is the responsibility of the reporting clients to define the EventId and the attributes associated with that EventId in the configuration file. This includes the EventId's causal elimination event relationships and new events and their event members. The EventId defines the error event's pool classification, device type and the specific hardware error low level description. An alert, network, new network device and new network are valid pool classifications for an event, in which network classified events are members of the network pool and alert classified events are members of the alert pool. It is the responsibility of the reporting clients to dictate the pool classification based on the events analysis and reportability as defined in the configuration file. Alerts differ from regular network events in that they are not eliminated by causal elimination or become a member of a new event. (New events and event causal elimination are defined in the configuration section). Thus, the alert event requires no analysis to determine reportability. A switch, switch link, adapter and adapter link are all valid device types. An example of an alert event is AT300010: "AT" stands for alert pool, "30" stands for an adapter device and "0010" stands for checkstop error. An example of a network event is NT200511: "NT" for network pool, "20" for switch link device and "0511" for "switch link synchronization failure. A structure representing the EventId is PoolClassDevicetypeErrDesc".

The EventId_location defines the logical location of the device in error. Reportable EventIds are defined down to their unique device location level or lower. The device locations, (e.g., switch, adapter) are defined down to, for instance, the Card# level (e.g., Frame#Cage#CagetypeDevicetypeCard#). Non-reportable alert events are defined down to their elimination level, which is defined in the configuration file, or lower. The EventId_location is used to apply EventId elimination, form new EventIds and report errors. A hex string representing the EventId_location is: Frame#Cage#CagetypeDevicetypeCard#Chip#Port#.

EventID_endpt_locations are used for non-alert link device type EventId's only and define the logical location of the link device's endpoint location. It is defined to, for instance, the Port# level, and may contain more than one endpoint location. For instance, a switch device is connected to both an adapter and riser device. It is used to apply EventId elimination, form new EventIds and report errors. A hex string representing the EventId_endpoint_locations is: Frame#Cage#CagetypeDevicetype Card#Chip#Port#.

In response to receiving the event, the first level analysis routine determines whether the event is a reportable alert or duplicate network event, INQUIRIES 602, 604, 606. Reportability is determined from the configuration file. If the alert event is a reportable event, it is reported immediately, STEP 608. To determine whether it is a duplicate network event, a check is made, for instance, as to whether the incoming event has the same event id and location as another event in the network pool. If the event is a duplicate network event, then the event is deleted, STEP 610, and processing of the first level analysis routine is then complete.

If the incoming event is an alert event, then the event is added to the alert pool, attributes associated with the event are obtained from the event configuration file and the event's timer is set, STEPs 612, 614, 616. Thereafter, endpoint and/or local device causal elimination is applied to existing events in the network pool, as defined in the configuration file and effected EventIds are marked for deletion, but not removed from the network pool, STEP 618. This completes processing of the first level analysis routine for this event.

Returning to INQUIRY 606, if the incoming event is not a duplicate network event, then the event is added to the appropriate network device subpool, STEP 620, and to the appropriate device subpools associated with it's endpoints (mark as endpoint), STEP 622. Attributes associated with the event are then obtained from the event configuration file and the event's timer is set, STEPs 624, 626. The event's timer is used to calculate the slow pool timer for a network pool. Moreover, the EventId's associated new EventIds and attributes are added to the appropriate pool (e.g., network pool for new network events and device subpool for new device events), STEPs 628, 630 (FIG. 6b). Thereafter, causal elimination is applied from events existing in the alert EventIds to this EventId, STEP 632.

For instance, existing alert EventIds' endpoint and/or local device elimination are applied to the incoming event, as defined by the configuration file. For example, if this is a link level event and it has an endpoint location which contains Card A, and there is an existing alert event which performs card-level elimination, and it was reported against Card A, the link level event is eliminated by virtue of the fact that its endpoint location contains Card A, which matches the location of this alert event down to the alert event's elimination level. (The elimination level defines the scope of influence of an event.) Additionally, existing network EventIds endpoint and/or local device elimination is applied to an incoming EventId and vice versa, STEP 634. Both EventIds can eliminate one another. The highest priority takes precedence. If both EventIds share the same priority, the existing EventId takes precedence. This completes processing of the first level analysis routine.

Alert events in the active alert pool remain in the pool until their individual time out values are reached. One embodiment of the logic associated with reaching a time out of an alert event is described with reference to FIG. 7. When an event in the alert pool times out, INQUIRY 700, the event is deleted from the alert pool, STEP 702. This is regardless of whether other events have timed out. If there are more events in the pool, INQUIRY 704, then processing continues with INQUIRY 700. Otherwise, processing is complete. Returning to INQUIRY 700, if an event in the pool has not timed out, then processing continues with INQUIRY 700.

In contrast to the alert pool, events remain in the active network pool until the slow pool timer expires. One embodiment of the logic associated with this time out is described with reference to FIG. 8. Initially, a determination is made as to whether the appropriate time outs have expired, INQUIRY 800. That is, have all the time outs in the pool expired. If not, then processing continues with INQUIRY 800. However, when the time outs have expired, then intermediate analysis routine 502 (FIG. 5) is invoked, STEP 802 (FIG. 8).

One embodiment of the logic associated with the intermediate analysis pool is described with reference to FIG. 9. In response to the expiration of the slow pool time out, the intermediate analysis routine closes the active network pool, STEP 900, providing a closed network pool (e.g., closed pool 512). By closing the pool, no other events may be placed in the pool. Thereafter, second level analysis routine 504 (FIG. 5) is invoked and passed the closed network pool for further analysis, STEP 902.

Figure 10A:
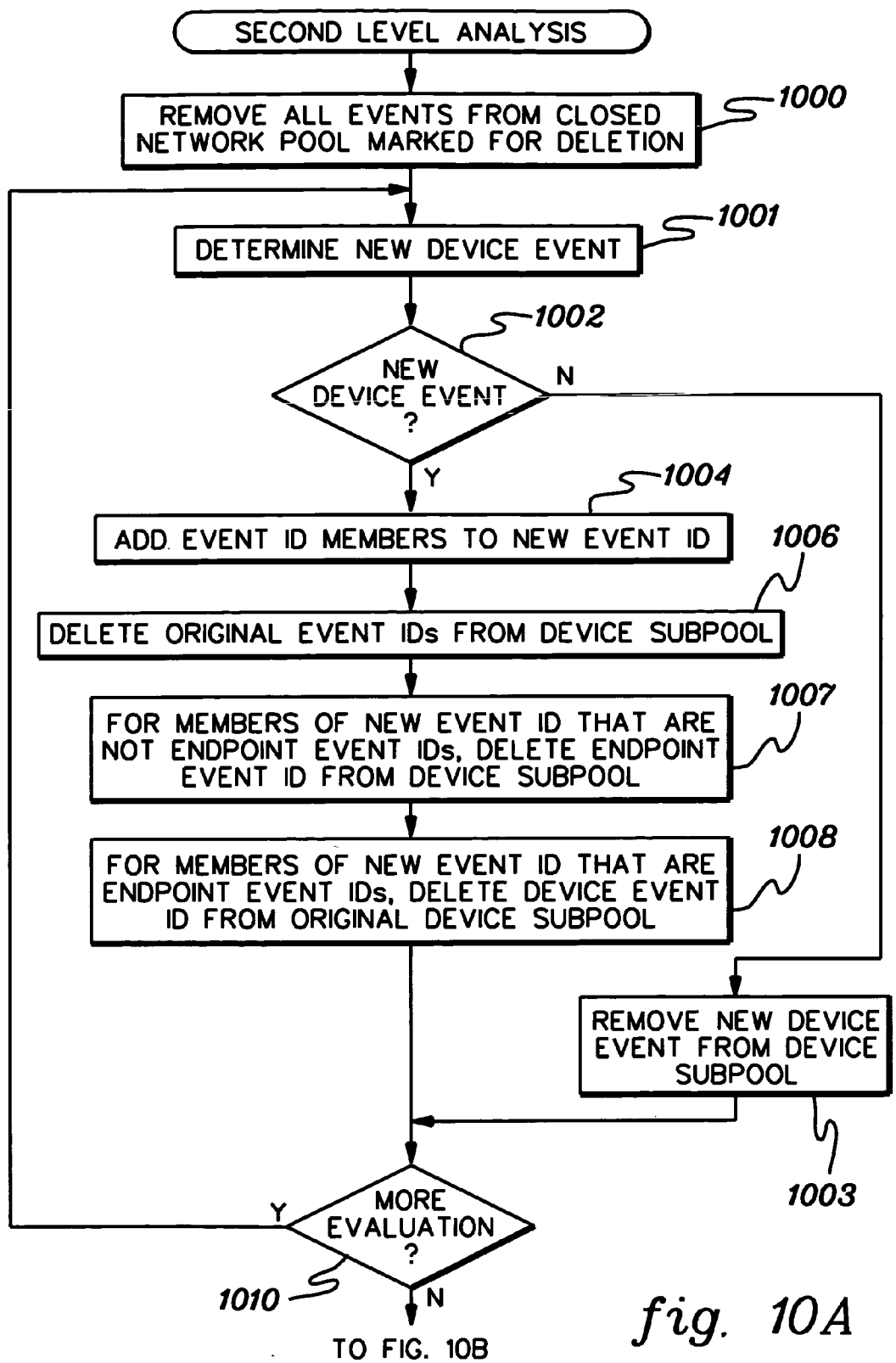
FIGS. 10a-10b depict one embodiment of the logic associated with a second level analysis routine used in the process flow of FIG. 5, in accordance with an aspect of the present invention.
Figure 10B:
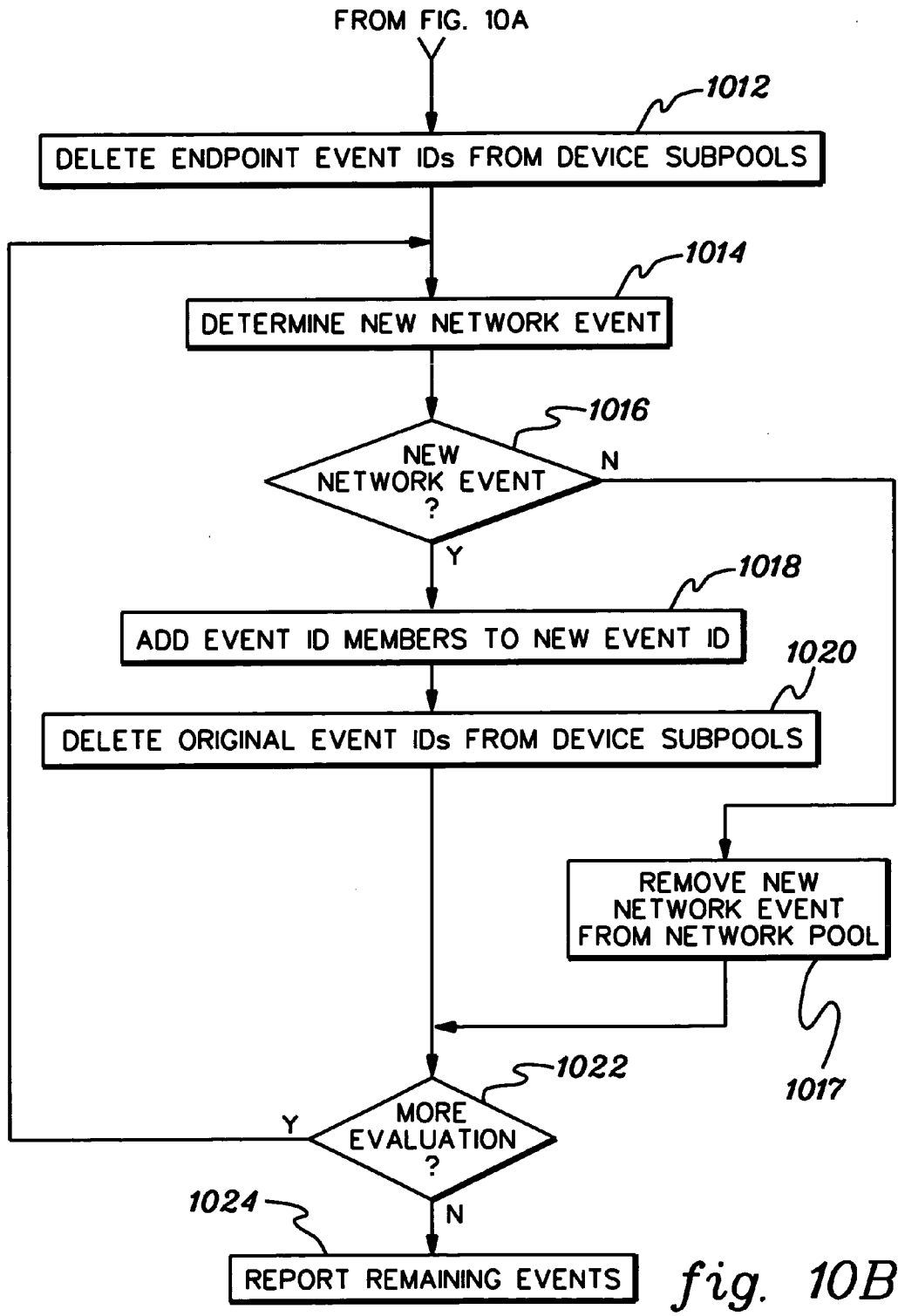

One embodiment of the logic associated with the second level analysis routine is described with reference to FIGs. 10a-10b. Initially, events effected by causal elimination are removed from the closed pool, STEP 1000 (FIG. 10a), after which a determination is made as to whether a new device event is to be formed from the remaining events, STEP 1001. In one example, this determination is made by checking the rules in the configuration file. Highest priority new device events ids are evaluated first. If a new device event is to be formed, INQUIRY 1002, then the event members are added to the new EventId, STEP 1004, and the original EventIds are deleted from the device subpool, STEP 1006. Additionally, for members of the new EventId that are not endpoint EventIds, their associated endpoint EventIds are deleted from the endpoint's device subpools, STEP 1007, and for members of the new EventId that are endpoint EventIds, their associated device EventIds are deleted from the device's device subpool, STEP 1008. If the new EventId is not formed, it is deleted from the device subpool, STEP 1003.

Thereafter, a determination is made as to whether more evaluation is to be performed to determine if there are additional new device events, INQUIRY 1010. If so, then processing continues with STEP 1000. However, if the evaluation is complete or there is no new device event, then processing continues with deleting endpoint event ids from device subpools, STEP 1012 (FIG. 10b).

Subsequently, a determination is made as to whether a new network event is to be formed from the events in the closed network pool, STEP 1014. Highest priority new network events are evaluated first.

If a new network event is to be formed, INQUIRY 1016, then EventId members are added to the new EventId, STEP 1018, and the original event ids are deleted from the device subpools, STEP 1020. If the new EventId is not formed, it is deleted from the network pool, STEP 1017.

Thereafter, a determination is made as to whether more evaluation is to be performed to determine if there are additional new network events, INQUIRY 1022. If so, processing continues with STEP 1014. Otherwise, or if there are no new network events, any remaining events (if node is master) are reported, STEP 1024. This completes processing of the second level analysis routine.

Described in detail above is a capability for facilitating management and analysis of events. Each event is placed in a pool based on its event classification. There are different pool classifications and different ways for managing the pool classifications. In one example, a slow pool time out is used to keep one classification of pool (e.g., network pool) open while active error events are arriving close together. In such cases, events are likely to be related. A multiple pool design provides the ability to increase the time outs on alert events and at the same time, decrease the time outs on the network events, if desired. Thus, the network pool remains open for a longer period of time only when it needs to and a shorter period of time when it does not. The fact that alert time outs are independent of the network pool time out, along with the fast pool remaining open during heavy traffic provides good flexibility and power.

Described above is a technique in which attributes are defined via a configuration file, causal elimination is applied to the network pool and new device and network events are formed. Further, EventId priorities and hardware locations are involved with the logical elimination of events and the forming of new events. The order in which these analyses are applied and the application of specific rules, along with the pool tunable analysis windows, enables the right events to be selected and reported.

In one example, the new events are formed using a new event language applied to each device subpool. The new language eliminates the need to write new analysis routines for each new event case that is to be supported.

Advantageously, a capability is provided in which events are related to one another, in regards to, for instance, priority, precedence, time and physical location. Analysis is performed on these events, and, in some cases, are combined into an inferred event which is not otherwise reported by the network. A capability is provided to determine and clearly and concisely state, based on events reported by devices within and without a network of devices, which, if any, network resources need to be replaced. Advantageously, this minimizes the duration of system and/or resource outage.

Advantageously, a capability is provided to properly determine failing components based on a hierarchical structure of the components within the network. Further, the reporting to service personnel those events which should not lead to the replacement of network resources is suppressed. The capability takes into account the hierarchical nature of hardware components in the system, and priorities of reported events, to report the most important events leading to replacement of a network resource(s). It takes into account the hierarchical nature of hardware components in the system and combines related events to determine if there is an underlying network resource value that would otherwise go unreported. In doing so, it suppresses recording of all of the combined events that lead to this inferred event; thus, clearly identifying the failing resource(s). It limits the number of events seen by service personnel to only those that are required to determine a broken resource; thus, clearly identifying the failing resource.

Advantageously, the following are provided, in one or more embodiments:

- An existing networking or communications environment where individual hardware related error events are raised, analyzed and determined as a serviceable and/or causal event and where this event will be reported by reporting clients at that time of determination with all associated device locations to a server daemon process for data persistence and real-time network dependent analysis.
- That event analysis and determination of serviceability is established by the reporting clients independent of other events in the network. Thus, if this event was not caused by another event in the network or combined with other events in the network to form a new event, it should be reported as its original serviceable event.
- That an event configuration file exists that is accessible to the server daemon process.

Although examples are described herein, many variations to these examples may be provided without departing from the spirit of the present invention. For instance, switch networks other than the High Performance Switch Network offered by International Business Machines Corporation may benefit from one or more aspects of the present invention. Similarly, other types of networks may benefit from one or more aspects of the present invention. Further, the switch network described herein may include more, less or different devices than described herein. For instance, it may include less, more or different nodes than described herein, as well as less, more or different switch frames than that described herein. Additionally, the links, adapters, switches and/or other devices or components described herein may be different than that described and there may be more or less of them. In the examples herein, the hardware components of the network are autonomous, but this is not necessary in other embodiments. Further, the service network may include less, additional or different components than that described herein.

In another embodiment, reporting clients, other than switch networks or components of switch networks, may report events and have those events evaluated in accordance with one or more aspects of the present invention.

In yet other embodiments, components other than the event daemon may perform one or more aspects of the present invention. Further, the event daemon may be a part of the communications network, separate therefrom or a combination thereof.

Additionally, the network can be in a different environment than that described herein. Moreover, one or more aspects of the present invention may be incorporated and/or used in communications environments other than networks, such as in computing environments or other types of systems. These and other variations are considered to be included within the scope of the claimed invention.

In addition to the above, although events have certain attributes described herein, other or different attributes may be associated with an event. Many variations to the description are possible without departing from the spirit of the present invention.

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of facilitating, in a communications environment in which at least one of individual serviceable and causal real-time events are determined and reported, selection of time-related serviceable events to be reported, said method comprising:

determining by a processor classification of an event, and responsive to the event being a first event of a first classification, placing the first event in a first event pool exclusively comprising first events of the first classification, each first event of multiple first events in the first event pool having an individual time-out attribute associated therewith which is activated with placement of the first event in the first event pool and which facilitates determining openness of the first event pool to placement of one or more additional first events therein, wherein the first event pool remains open to placement of one or more additional first events therein until the individual time-out attribute of each first event in the first event pool expires;

having a second event pool comprising one or more second events exclusively of a second classification, each second event of the one or more second events having an individual time-out attribute associated therewith which is activated with placement of the second event in the second event pool, said individual time-out attribute of a second event being tunable to control an amount of time that second event is active in the second event pool and usable in applying causal elimination against one or more first events of the first event pool, wherein events of the first event pool and the second event pool are related in time as defined by the individual time-outs of the events and wherein the tuning of the time-outs controls which events are related to one another in time in that the time-out of a second event of the one or more second events in the second event pool defines an elimination window of time for potential use of that second event in applying causal elimination against the one or more first events of the first event pool and that the individual time-out attributes of the multiple first events in the first event pool define an active window of time during which the first event pool remains open for one or more second events of the second event pool to be used in applying causal elimination against the one or more first events of the first event pool;

said second event pool comprising an alert pool and the one or more second events of the second event pool being one or more alert events, said alert events being classified as events in which reportability of those events are not affected by other events in the environment and the reporting being independent of other events in the communications environment; and performing by the processor causal elimination on one or more first events of said first event pool using one or more second events of the second event pool prior to expiration of the associated one or more individual time-out attributes of the one or more second events and prior to the first event pool closing, wherein closing of said first event pool is independent of time-outs of the one or more second events of the second event pool, thus facilitating timely reporting of one or more first events that are to be serviced.

2. The method of claim 1, wherein the first event pool is a network pool comprising network events.

3. The method of claim 2, wherein at least one of said first event pool or said second event pool comprises a plurality of events.

4. The method of claim 2, wherein a network event is classified as an event in which the reportability of the event is affected by one or more other events of the communications environment, such that at least one of the following may occur: one or more other events eliminate the event, the event is reported as a member of a new event.

5. The method of claim 2, wherein an incoming event that is a duplicate of an existing event of the network pool is eliminated by the existing event to avoid an infinite condition in which the network pool cannot close.

6. The method of claim 2, further comprising:
receiving a network event subsequent to a closing of the network pool; and
automatically opening another network pool, in response to receiving the network event subsequent to the closing, to service the received network event.

7. The method of claim 2, wherein the performing causal elimination comprises using at least one event of at least one of the first event pool and the second event pool to mark for elimination at least one event from the network pool, said elimination being based on at least one of a defined endpoint elimination and a local device elimination.

8. The method of claim 2, further comprising:
performing evaluation on one or more events in the network pool after closing thereof; and
reporting zero or more events remaining in the network pool, in response to the evaluation.

9. The method of claim 8, wherein the performing evaluation comprises eliminating one or more events effected by causal elimination and forming one or more new network events from one or more events remaining in the closed network pool.

10. The method of claim 6, wherein the another network pool when closed triggers an intermediate analysis routine.

11. The method of claim 1, further comprising reporting an alert event prior to adding the alert event to the alert pool.

12. The method of claim 11, further comprising configuring the alert event to be reported, wherein an alert event of the alert pool is configured as being reportable or not.

13. The method of claim 1, wherein the alert pool does not close and an alert event of the alert event pool is removed from the alert event pool in response to expiration of its associated individual time-out attribute.

14. The method of claim 1, wherein an alert event is configured for performing causal elimination across multiple first event pools.

15. The method of claim 1, wherein reportability of one or more second events of the second event pool is independent of time-outs of the one or more first events of the first event pool, thereby facilitating timely reporting of one or more second events.

16. The method of claim 1, wherein the associated individual time-out attribute for an event is set when the event is added to one of the first event pool or the second event pool.

17. The method of claim 1, further comprising providing, in at least one configuration file comprising each first event with its associated attributes and each second event with its associated attributes, said associated attributes defining the individual time-out attributes for the events and one or more analysis definitions and relationships to one or more other events.

18. A computer system for facilitating, in a communications environment in which at least one of individual serviceable and causal real-time events are determined and reported, selection of time-related serviceable events to be reported, said computer system comprising:
a memory; and
a processor in communications with the memory, wherein the computer system is configured to perform a method, said method comprising:
determining by the processor classification of an event, and responsive to the event being a first event of a first classification, placing the first event in a first event pool exclusively comprising first events of the first classification, each first event of multiple first events in the first event pool having an individual time-out attribute associated therewith which is activated with placement of the first event in the first event pool and which facilitates determining openness of the first event pool to placement of one or more additional first events therein, wherein the first event pool remains open to placement of one or more additional first events therein until the individual time-out attribute of each first event in the first event pool expires;
having a second event pool comprising one or more second events exclusively of a second classification, each second event of the one or more second events having an individual time-out attribute associated therewith which is activated with placement of the second event in the second event pool, said individual time-out attribute of a second event being tunable to control an amount of time that second event is active in the second event pool and usable in applying causal elimination against one or more first events of the first event pool, wherein events of the first event pool and the second event pool are related in time as defined by the individual time-outs of the events and wherein the tuning of the time-outs controls which events are related to one another in time in that the time-out of a second event of the one or more second events in the second event pool defines an elimination window of time for potential use of that second event in applyingcausal elimination against the one or more first events of the first event pool and that the individual time-out attributes of the multiple first events in the first event pool define an active window of time during which the first event pool remains open for one or, more second events of the second event pool to be used in applying causal elimination against the one or more first events of the first event pool;

said second event pool comprising an alert pool and the one or more second events of the second event pool being one or more alert events, said alert events being classified as events in which reportability of those events are not affected by other events in the environment and the reporting being independent of other events in the communications environment; and performing by the processor causal elimination on one or more first events of said first event pool using one or more second events of the second event pool prior to expiration of the associated one or more individual time-out attributes of the one or more second events and prior to the first event pool closing, wherein closing of said first event pool is independent of time-outs of the one or more second events of the second event pool, thus facilitating timely reporting of one or more first events that are to be serviced.

19. A computer program product for facilitating, in a communications environment in which at least one of individual serviceable and causal real-time events are determined and reported, selection of time-related serviceable events to be reported, the computer program product comprising:

a storage non-transitory medium readable by a processing circuit and storing instructions for execution by the processing circuit for performing a method comprising:

determining classification of an event, and responsive to the event being a first event of a first classification, placing the first event in a first event pool exclusively comprising first events of the first classification, each first event of multiple first events in the first event pool having an individual time-out attribute associated therewith which is activated with placement of the first event in the first event pool and which facilitates determining openness of the first event pool to placement of one or more additional first events therein, wherein the first event pool remains open to placement of one or more additional first events therein until the individual time-out attribute of each first event in the first event pool expires;

having a second event pool comprising one or more second events exclusively of a second classification, each second event of the one or more second events having an individual time-out attribute associated therewith which is activated with placement of the second event in the second event pool, said individual time-out attribute of a second event being tunable to control an amount of time that second event is active in the second event pool and usable in applying causal elimination against one or more first events of the first event pool, wherein events Of the first event pool and the second event pool are related in time as defined by the individual time-outs of the events and wherein the tuning of the time-outs controls which events are related to one another in time in that the time-out of a second event of the one or more second events in the second event pool defines an elimination window of time for potential use of that second event in applying, causal elimination against the one or more first events of the first event pool and that the individual time-out attributes of the multiple first events in the first event pool define an active window of time during which the first event pool remains open for one or, more second events of the second event pool to be used in applying causal elimination against the one or more first events of the first event pool;

said second event pool comprising an alert pool and the one or more second events of the second event pool being one or more alert events, said alert events being classified as events in which reportability of those events are not affected by other events in the environment and the reporting being independent of other events in the communications environment; and performing causal elimination on one or more first events of said first event pool using one or more second events of the second event pool prior to expiration of the associated one or more individual time-out attributes of the one or more second events and prior to the first event pool closing, wherein closing of said first event pool is independent of time-outs of the one or more second events of the second event pool, thus facilitating timely reporting of one or more first events that are to be serviced.

* * * * *